No. 715,063. Patented Dec. 2, 1902.
C. HEARN.
WIND STACKER.
(Application filed Mar. 3, 1902.)

(No Model.)

Witnesses

Inventor
Charles Hearn
By Wilkinson + Fisher
Attorneys

UNITED STATES PATENT OFFICE.

CHARLES HEARN, OF PORT ELGIN, CANADA.

WIND-STACKER.

SPECIFICATION forming part of Letters Patent No. 715,063, dated December 2, 1902.

Application filed March 3, 1902. Serial No. 96,562. (No model.)

*To all whom it may concern:*

Be it known that I, CHARLES HEARN, a British subject, residing at Port Elgin, in the Province of Ontario, Canada, have invented certain new and useful Improvements in Wind-Stackers; and I do hereby declare the following to be a full, clear, and exact description of the invention, such as will enable others skilled in the art to which it appertains to make and use the same.

My invention relates to improvements in fans or blowers, such as are employed in wind-stackers for threshing-machines, and has for its object to provide such a device wherein a practically constant speed of rotation is maintained at all times, even though the driving power be variable or intermittent.

To more fully set forth my invention, reference will be had to the accompanying drawings, wherein—

Figure 1:
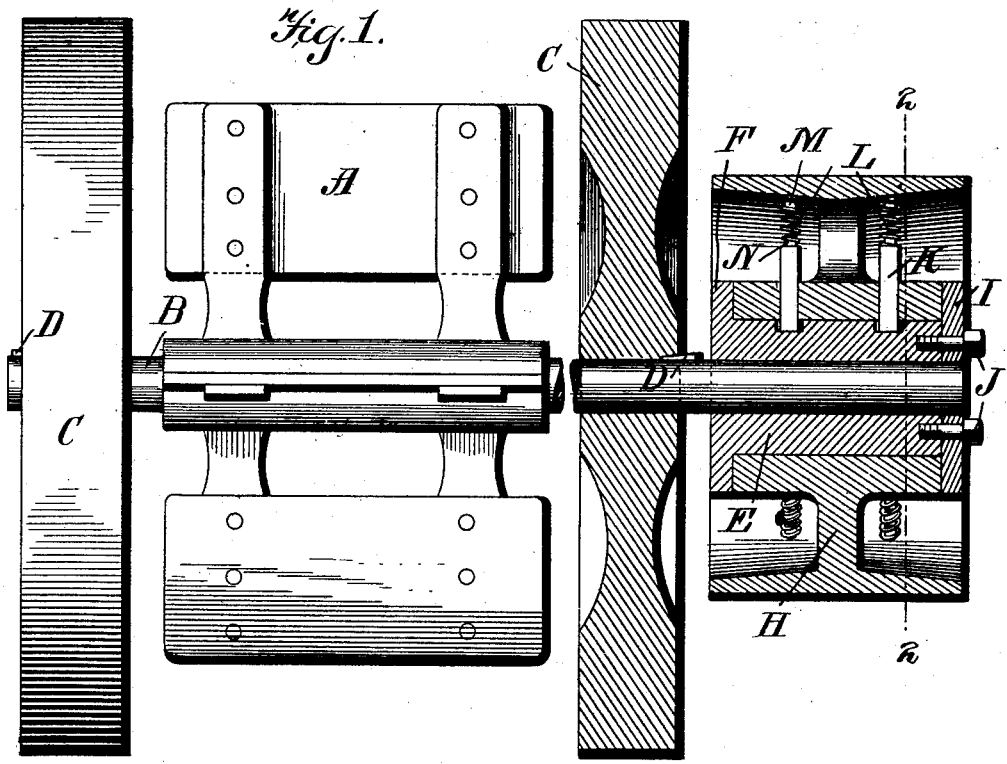
Figure 2:
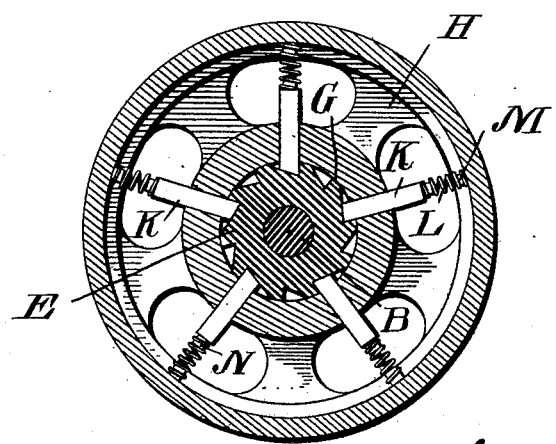

Figure 1 is a side elevational view partly in section, the fan-casing being omitted; and Fig. 2 is a transverse sectional view taken through the driving-pulley on the line 2 2, Fig. 1.

In the views, A represents the fan or blower, of any desired construction, rigidly mounted upon the driving-shaft B. Mounted upon this shaft B are one or more fly-wheels C C, rigidly secured upon the shaft B by the keys D D, the weight of these fly-wheels being determined in direct ratio to the air-surface of the fan or blower A.

E is a sleeve rigidly mounted upon the shaft B, provided upon one end with a flange F and upon its periphery with ratchet-teeth G G, extending entirely around the same, two or more rows of such teeth being preferably provided. Over this sleeve E is loosely slipped the hollow hub of the pulley H, so as to allow the same to rotate freely thereon, the same being held upon said sleeve E by the plate I, secured in place by the screws J passing into the sleeve E. The hub of this pulley H is perforated radially at regular intervals around its circumference, through which pass the pawls K, having inclined ends adapted to engage the ratchet-teeth G upon said sleeve E when motion is imparted to said pulley in one direction to rotate said sleeve and to slip over said teeth when such motion diminishes or ceases. These pawls K are normally pressed into engagement with said teeth by means of spiral springs L, resting in stops M N upon the inner periphery of the pulley and upon the ends of said pawls, displacement of the springs being thus prevented.

The operation of the device is as follows: Motion is imparted in the proper direction of rotation to the fan or blower A through the belt or pulley wheel H, driven from an engine or other convenient source of power, as the pawls K, carried by the pulley, will engage behind the teeth G of the rigid sleeve E. These pawls K will remain in such engagement until the power applied to the driving-pulley H diminishes or ceases. When this happens, the pulley H diminishes its speed, causing the pawls K to ride up over the ratchet-teeth G, the shaft B, carrying the fly-wheels C C and blower A, continuing to rotate almost without diminished speed by reason of the inertia of the fly-wheels C C being imparted to the shaft and to said fan or blower. This will continue until the driving-pulley regains its speed, when the ratchet-pawls K will again engage the ratchet-teeth G upon the sleeve E, when the power from said pulley will be imparted to said shaft.

Having thus described my invention, what I claim, and desire to secure by Letters Patent of the United States, is—

In a wind-stacker or the like, a fan or blower comprising a driving-shaft, fan-blades rigidly mounted upon said shaft, a pair of fly-wheels keyed upon said shaft, one upon each side of said fan, a sleeve rigidly secured upon said shaft provided with two sets of ratchet-teeth running parallel upon the periphery of said sleeve, a pulley journaled to revolve freely upon said sleeve, a plurality of radially-disposed pawls passing through apertures in the hub of said pulley and adapted to engage the ratchet-teeth upon said sleeve, said pawls being arranged in two parallel rows registering with the parallel rows of ratchet-teeth, radial projections located at intervals upon the inner periphery of said pulley in alinement with said radially-disposed pawls, and spiral springs interposed between the outer ends of said radially-disposed pawls and said radial projections.

In testimony whereof I affix my signature in presence of two witnesses.

CHARLES HEARN.

Witnesses:
JOHN W. MITCHELL,
WM. P. POWELL.